(12) United States Patent
Motose et al.

(10) Patent No.: US 6,227,165 B1
(45) Date of Patent: May 8, 2001

(54) ENGINE CONTROL STRATEGY AND SYSTEM

(75) Inventors: Hitoshi Motose; Masahiko Kato, both of Hamamatsu (JP)

(73) Assignee: Sanshin Kogyo Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/207,728

(22) Filed: Dec. 8, 1998

(30) Foreign Application Priority Data

Dec. 8, 1997 (JP) .................................................... 9-352029

(51) Int. Cl.⁷ ................................. F02B 1/10; F02D 41/30
(52) U.S. Cl. ........................................... 123/305; 123/73 C
(58) Field of Search .................................. 123/305, 73 C (56) References Cited

U.S. PATENT DOCUMENTS

| | | | |
|---|---|---|---|
| 4,949,689 | * 8/1990 | Schlunke | 123/73 C |
| 5,054,444 | * 10/1991 | Morikawa | 123/73 C |
| 6,058,907 | * 5/2000 | Motose et al. | 123/305 |

\* cited by examiner

*Primary Examiner*—Andrew M. Dolinar
(74) *Attorney, Agent, or Firm*—Knobbe, Martens, Olson & Bear, LLP (57) ABSTRACT

A direct injection system and control methodology for two-cycle crankcase compression engines wherein the injection timing is advanced from those normally utilized to avoid the incomplete combustion that results from the prior art method. The injection timing is advanced so that it occurs while the exhaust port is still open but it is timed in such a way that the injected fuel will not be swept out of the exhaust port before the exhaust port closes and so that the fuel will vaporize adequately to be completely burned. The initiation of injection timing is adjusted in response to in combustion chamber air velocity determined by certain parameters such as engine speed and intake air flow.

13 Claims, 9 Drawing Sheets

ENGINE CONTROL STRATEGY AND SYSTEM

BACKGROUND OF THE INVENTION

This invention relates to an engine control strategy and system and more particularly to an improved control strategy and system for direct cylinder injected, two cycle, internal combustion engines.

The advantages afforded by the simplicity of two cycle engines is well recognized. Also, the ability of these engines to produce greater horsepower per displacement than four cycle engines due to their firing every cycle of rotation is acknowledged. However, because of the overlap in the scavenging and exhaust cycles and other factors, environmental concerns are making the use of two cycle engines more difficult.

One way in which the performance of a two cycle engine can be significantly improved and, at the same time, the fuel economy and exhaust emission control can be improved is through the use of direct cylinder fuel injection. With this type of injection system, fuel is injected directly into the combustion chamber for combustion therein. By utilizing direct cylinder injection, it may be possible to obtain stratification of the charge and, accordingly, exhaust emission and fuel economy improvement.

However, the fact that exhaust port is opened during a portion of the intake or scavenging cycle gives rise to the possibility that injected fuel can be swept out of the exhaust port. Therefore, it has generally been the practice to inject the fuel very late in the compression cycle and oftentimes fuel injection begins immediately after the exhaust port is closed and before the piston has reached its top dead center position. Such a practice will ensure that fuel does not pass out of the exhaust port.

However, this late injection of fuel, particularly under lower speed and load conditions gives rise to a very great difficulty in obtaining proper mixing in the combustion chamber. That is, when the fuel is injected late, there is less turbulence and airflow in the combustion chamber. This result in poor mixing and incomplete combustion.

It is, therefore, a principal object of this invention to provide an improved direct injected two cycle engine and operating strategy.

It is a further object of this invention to provide a fuel control arrangement for a direct injected two cycle engine wherein the timing of the fuel injection is governed so as to ensure that fuel will not pass out of the exhaust port but also so that the fuel is well mixed in the combustion chamber before ignition timing.

To improve the operation of direct injected, two cycle engines, a system has been proposed by us that is described in the co-pending application entitled, "Control for Direct Injected Two Cycle Engine", Ser. No. 09/188,953, Filed Nov. 10, 1998, now U.S. Pat. No. 6,058,908 and assigned to the Assignee hereof. As disclosed therein the injection initiation and duration is controlled so as to minimize the likelihood of fuel escaping from the exhaust port while still obtaining maximum power output. In accordance with that arrangement, the initial fuel injection is begun at a point when the exhaust port is still open but at a time wherein the fuel injected will not reach the exhaust port during the time when the exhaust port is still open. Basically, injection is done while the exhaust port is open rather than delaying it until after it closes as with more conventional methodologies.

In order to achieve this result and still avoid the likelihood that unburned fuel may pass out of the exhaust port, further improvements are believed to be possible. For example, the premise of our aforenoted pending application is based upon injecting so that the duration will end at a time when the first injected fuel will not yet have reached the exhaust port before it has closed. However, it has been discovered that factors may be present in the combustion chamber that can effect the time at which this event occurs.

It is, therefore, a principle object of this invention to provide an improved engine control strategy and system for a direct injected two-cycle engine.

It is a further object of this invention to provide an improved engine control strategy and system for a direct injected two-cycle engine wherein in-cylinder conditions are considered in determining the injection timing.

In conjunction with direct injection in the cylinder, it is also important that the fuel be injected at such a time and for such a duration that it will well mix in the combustion chamber. Unless the fuel is well mixed with the surrounding air, the particles may be too large to completely burn during the combustion cycle.

It is, therefore, a still further object of this invention to provide an improved fuel injection control and method therefor that will improve the efficiency of two-cycle engines while still maintaining good exhaust emission control.

SUMMARY OF THE INVENTION

This invention is adapted to be embodied in a two cycle crankcase compression internal combustion engine. The engine is comprised of an engine body that defines a cylinder bore in which a piston reciprocates to form a combustion chamber. The cylinder bore is provided with at least one scavenge port and at least one exhaust port that are opened and closed by the reciprocation of the piston in the cylinder bore. A fuel injector is mounted so that it sprays its fuel directly into the combustion chamber.

In accordance with an engine and control system embodying the invention, the fuel injection timing is controlled by a control system so that the beginning of fuel injection is initiated at a time when the exhaust port is still open and which point is determined at least in part by the air flow velocity in the combustion chamber so as to improve mixing of the injected fuel with the air and to insure that unburned fuel will not reach the exhaust port before it closes.

In accordance with a method for operating the engine embodying the invention, the fuel injection timing is controlled so that the beginning of fuel injection is initiated at a time when the exhaust port is still open and which point is determined at least in part by the air flow velocity in the combustion chamber so as to improve mixing of the injected fuel with the air and to insure that unburned fuel will not reach the exhaust port before it closes

DETAILED DESCRIPTION OF THE PREFERRED EMBODIMENTS OF THE INVENTION

Figure 1:
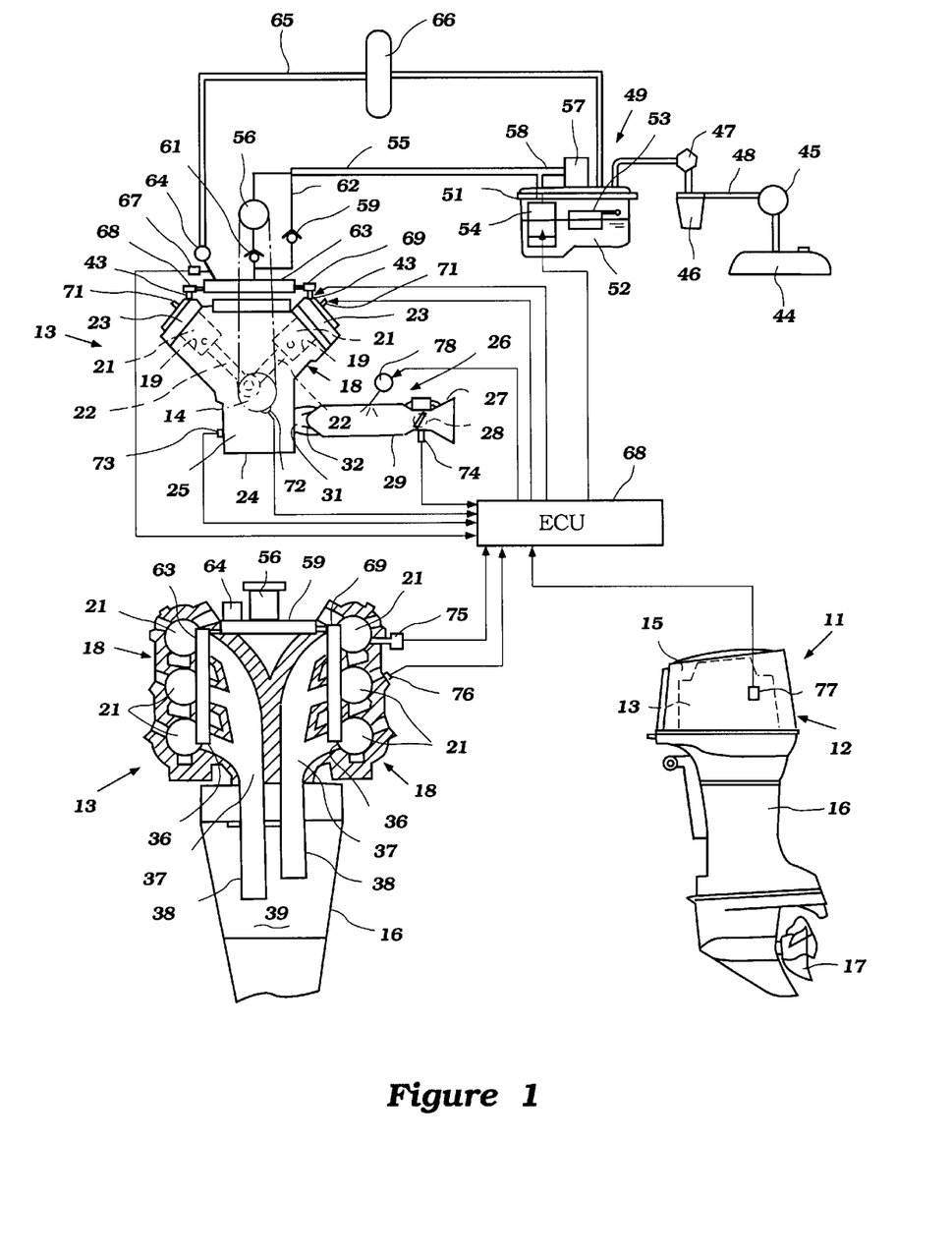
FIG. 1 is a partially schematic view having three portions that are connected by the controlling ECU of the engine. The lower right hand portion of this view shows a side elevational view of an outboard motor, the lower left hand side shows a rear elevational view of the outboard motor on an enlarged scale and a partial cross-section of the engine taken through the cylinders and exhaust manifold and the upper portion shows a top plan view of the engine and the fuel supply system with portions shown schematically.

Referring initially primarily to FIG. 1, the lower right hand portion of this view illustrates a side elevational view of an outboard motor that is constructed and operated in accordance with the invention. The outboard motor is indicated generally by the reference numeral 11 and except as will hereinafter be noted maybe considered to be of a generally conventional construction.

The outboard motor 11 is comprised of a power head 12 that contains a powering internal combustion engine 13. As best seen in the other two portions of this figure, the engine 13 is, in the illustrated embodiment, of the V6 type and operates on a two stroke crankcase compression principal. Although the number of cylinders and cylinder orientation can be varied, the invention has particularly utility in connection with two cycle engines.

As is typical with outboard motor practice, the engine 13 is supported in the power head 12 so that its crankshaft 14 rotates about a vertically extending axis for a reason which will be described momentarily.

The power head 12 is completed by a protective cowling 15 which surrounds and protects the engine 13. This protective cowling 15 is formed with an air inlet opening so that induction air for operation for the engine 13 can be drawn from the surrounding atmosphere.

The engine 13 and specifically its crankshaft 14 is coupled to a driveshaft (not shown) that depends into and is journaled within a driveshaft housing lower unit assembly 16. This is the reason for the vertical orientation of the axis of rotation of the crankshaft 14. This driveshaft depends into the lower unit where it drives a propulsion device for an associated watercraft through a suitable transmission. In the illustrated embodiment, the propulsion device comprises a propeller 17 which is selectively driven in forward and reversed directions through a bevel gear reversing transmission of the type well known in this art.

The outboard motor 11 also includes clamping and swivel brackets or another arrangement for mounting it to the transom of an associated watercraft. Since these types of constructions are well known in the art they have not been illustrated and further description of them is not believed to be necessary to permit those skilled in the art to practice the invention.

Referring now primarily to the lower left hand view and the upper view, the engine 13 includes a cylinder block, indicated generally by the reference numeral 18. Because of the V-type configuration employed in the illustrated embodiment, the cylinder block 18 is formed with two cylinder banks each of which has three vertically spaced cylinder bores 19. Pistons 21 are slidably supported in the cylinder bores 19. The pistons 21 are connected by means of connecting rods 22 to the throws of the crankshaft 14 for driving it in a known manner.

Cylinder head assemblies, indicated generally by the reference numeral 23 are affixed to the banks of the cylinder block 18 and close the cylinder bores 21. These cylinder head assemblies 22, the cylinder bores 19 and the pistons 21 form the combustion chambers of the engine 13.

The crankshaft 14 rotates in a crankcase chamber defined by the cylinder block 18 and a crankcase member 24 that is affixed thereto. As is typical with two cycle crankcase compression engines, the portions of the crankcase chamber, indicated schematically at 25, associated with each of the cylinder bores 19 are sealed from each other.

An air charge is delivered to these individual crankcase chamber sections 25 by an air induction system which appears also in the upper portion of this figure and which is indicated generally by the reference numeral 26. This induction system 26 includes an air inlet device 27 that may include a silencing arrangement and which draws air from within the protective cowling 15 that has been admitted through the aforenoted inlet opening.

A throttle valve 28 is provided in throttle bodies that communicate with the intake device 27 and deliver it to intake manifold runners 29 of an intake manifold assembly. The throttle valves 28 are controlled in any suitable manner to satisfy the operator demand. The intake manifold runners 29 communicate with intake ports 31 formed in the crankcase member 24 and each associated with a respective cylinder bore 19.

Reed type check valves 32 are provided in the manifold runners 29 adjacent the intake ports 31. These reed type check valves permit an air charge to be drawn into the crankcase chambers when the respective pistons 21 are moving upwardly in their cylinder bores 19. As the pistons 21 move downwardly, the charge in the crankcase chambers 25 will be compressed and the respective reed type check valve 32 will close to preclude reverse flow.

Referring now additionally to FIGS. 2–5, it will be seen that each cylinder bore is provided with a scavenging system. In the illustrated embodiment, the scavenging system is of the Schnurl type and includes a pair of side, main scavenge ports 33 and a center, auxiliary scavenge port 34. Scavenge passages 35 communicate the crankcase chambers 25 with each of the scavenge ports 34 and 35. As is well known in two cycle practice, the scavenge ports 33 and 34 are opened and closed by the reciprocation of the pistons 21 in the cylinder bores 19.

Figure 2:
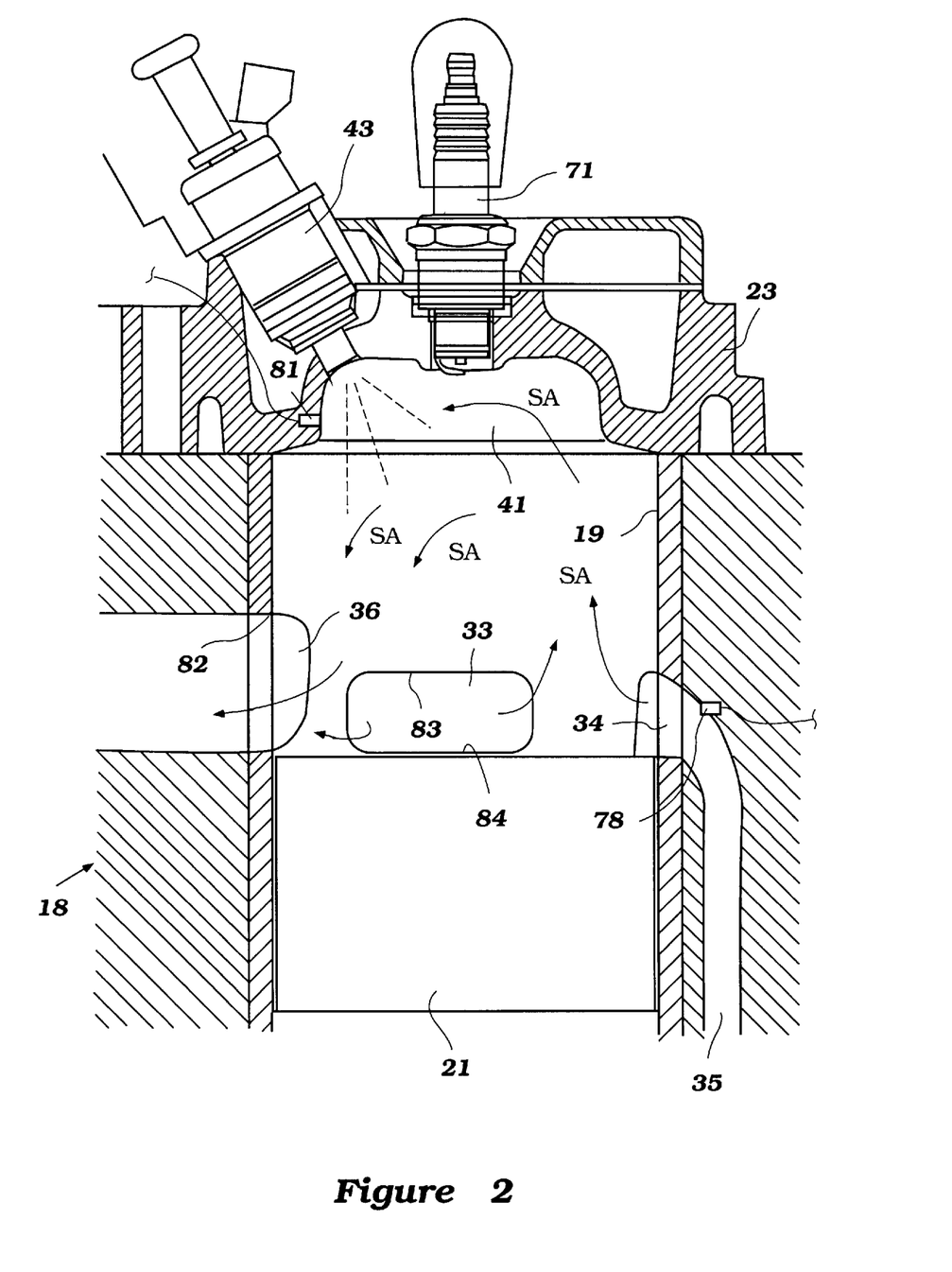
FIG. 2 is an enlarged cross-sectional view taken through a single cylinder of the engine and depicts part of the theory by which the control strategy operates.

It should be noted that the main scavenge ports 33 are disposed on opposite sides of an exhaust port 36 which is diametrically opposite the auxiliary scavenge port 34. As may be best seen in the lower left hand portion of FIG. 1, the exhaust ports 36 communicate with exhaust manifolds 37 that are formed integrally within the cylinder block 18. Basically, there is an exhaust manifold 37 for each bank of cylinders.

These exhaust manifolds 37 terminate in exhaust pipes 38 that depend into an expansion chamber 39 formed in the driveshaft housing and lower unit 16. This expansion chamber 39 communicates with a suitable high speed underwater exhaust gas discharge and a low speed above-the-water exhaust gas discharge of any known type. The particular type of exhaust system employed does not form any part of the invention although the invention does have utility in connection with engines having multiple cylinders and arrangements wherein a plurality of exhaust ports of those cylinders communicate with a common exhaust manifold.

Figure 3:
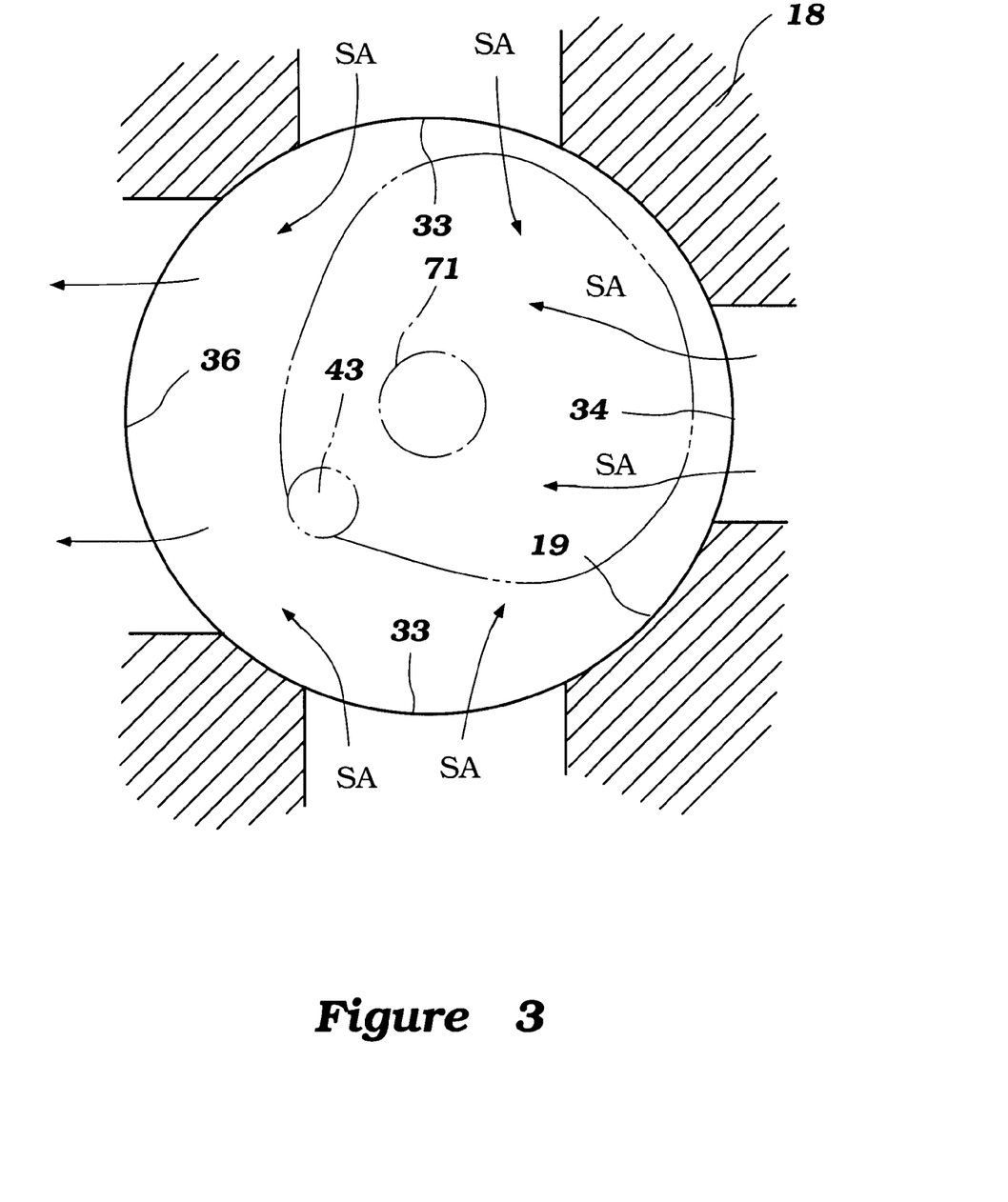
FIG. 3 is a cross-sectional view taken through the cylinder shown in FIG. 2 to show the scavenging air flow pattern and the path of injected fuel.
Figure 4:
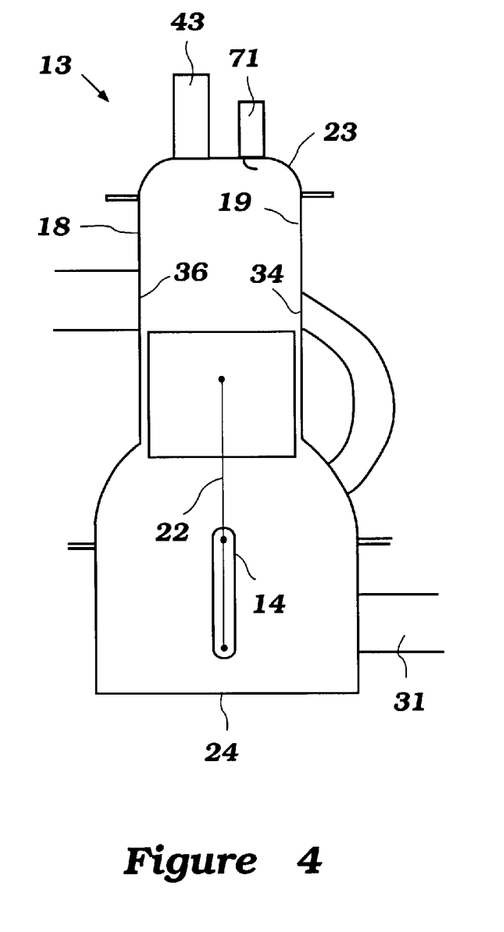
FIG. 4 is a partially schematic view taken generally in the same direction as FIG. 2 and shows the piston at its bottom dead center position.

As the pistons 21 move downwardly in their cylinder bores 19 toward the bottom dead center position shown in FIG. 4, the charge compressed in the crankcase chambers 25 will be compressed and eventually transfer to the respective engine combustion chamber, indicated generally by the reference numeral 41 through the scavenge passages 35 and scavenge ports 33 and 34 when they are opened by the movement of the piston 21. The flow of scavenging air is shown in FIGS. 2 and 3 by the arrows SA.

In accordance with an important feature of the invention, the engine 13 is provided with a direct cylinder fuel injection system. This fuel injection system is shown in part schematically in the upper portion of FIG. 1 and will now be described by particular reference to that figure. Before referring thereto, however, it should be noted that fuel injectors 42 are mounted in the cylinder head assembly 23 so as to spray fuel from this fuel supply system directly into the combustion chambers 41. The location and functioning of these fuel injectors 43 will be described after the system which supplies fuel to them has been described.

As is typical with outboard motor practice, the outboard motor 11 is supplied with fuel from a main fuel tank 44 which is normally mounted within the hull of the associated watercraft. Fuel is supplied form this tank 44 by a first low pressure pump 45 to a fuel filter 46 that is mounted within the protective cowling 12. The connection from the fuel tank 44 to the filter 46 includes a conduit 47 having a quick disconnect coupling of a known type.

A second, engine driven low pressure fuel pump 47 in the power head 12 collects the fuel from the fuel filter 46 and delivers it to a vapor separator, indicated generally by the reference numeral 49. The low pressure fuel pumps 48 may be of the type that are operated by crankcase pressure variations as is well known in this art.

The vapor separator 49 includes an outer housing 51 that is mounted at a suitable location within the protective cowling 15. A level of fuel, indicated at 52 is maintained in this housing 51 by a valve operated by a float 53.

Contained within the housing 51 is an electrically driven pressure pump 54 which develops a higher pressure than the pump 47 but a pressure that is not really high enough for effective high pressure direct cylinder injection.

This fuel is discharged from the vapor separator housing 51 through a supply conduit 55 to a high pressure, engine driven, positive displacement pump 56. The pump 56 may be of any known type and preferably has one or more plungers operated by cams for delivering extremely high pressures at a positive displacement. The pressure at which fuel is delivered to the high pressure pump 56 is regulated by a low pressure regulator 57 in a return line 58 that communicates the pressure line 55 back with the interior of the vapor separator body 51.

The high pressure pump 56 delivers fuel under pressure to a main fuel manifold 59 through a conduit in which a check valve 61 is positioned. A parallel conduit 62 extends around the high pressure pump 56 to the main fuel manifold. A check valve 63 is provided in this bypass line so that when the high pressure pump 56 is generating high pressure fluid, no flow will occur through the line 62.

A high pressure regulator 64 is provided in the main fuel manifold 59 and limits the maximum pressure of the fuel supply to the fuel injectors 43. This is done by dumping fuel back to the vapor separator assembly 49 through a return line 65. A fuel heat exchanger or cooler 66 may be provided in this return line 65 so as to ensure that the fuel is not at too high a temperature.

A pressure sensing device 67 is provided also in the main fuel manifold 59 for providing a fuel pressure signal to an ECU, indicated at 68 in FIG. 1 for controlling the engine systems, as will be described.

The main fuel manifold 59 supplies fuel to a pair of fuel rails 69 each of which is associated with a respective one of the cylinder banks. The fuel rails 69 each supply fuel in a known manner to the fuel injectors 43 of the respective cylinder banks.

As seen in FIGS. 2 and 3, the fuel injectors 43 are mounted in the cylinder head assemblies 23, in the illustrated embodiment, over the exhaust ports 36 on the exhaust side of the engine. These injectors spray downwardly toward the heads of the pistons 21. The fuel injectors 43 are preferably of the solenoid operated type and have a solenoid valve which, when opened, controls the discharge of fuel into the combustion chambers as shown in broken lines in FIG. 2 and in a pattern as shown by the phantom line view of FIG. 3 so as to provide a fuel patch in the combustion chamber, the size of which depends upon the duration of fuel injection as will become apparent.

Spark plugs 71 are mounted in the cylinder head assemblies 23 and have their spark gaps disposed substantially on the axis of the cylinder bores 19. These spark plugs 71 are fired by an ignition circuit under the control of the ECU 68.

The ECU 68 controls the timing of firing of the spark plugs 71 and the beginning and duration of fuel injection by the injector 69. To this end, there is provided a number of sensors which sense either engine running conditions, ambient conditions or conditions of the outboard motor 11 that will effect engine performance. Certain of the sensors are shown schematically in FIG. 1 and will be described by reference to that figure. It should be readily apparent to those skilled in the art, however, that other types of sensing and control arrangements may be provided operating within the general parameters which will be set forth later having to do with the timing of initiation of fuel injection.

A crank angle sensor 72 is associated with the crankshaft 14. This sensor 72 provides not only a signal of crank angle but by comparing that signal with time an indication of crankshaft rotational speed.

There is also provided a crankcase pressure sensor 73 which senses the pressure in one or all of the crankcase chambers 25. By measuring crankcase pressure at a particular crank angle, engine air induction amount can be determined.

Engine or operator demand is determined by a throttle position sensor 74 that operates in conjunction with a throttle valve 28 so as to determine this function.

The ECU 68 may operate on a feedback control condition and thus, an air fuel ratio sensor 75 is provided that communicates with the combustion chambers or exhaust port of at least one of the cylinder. Preferably, an oxygen sensor is utilized for this purpose, although other types of devices may be employed.

Engine temperature is sensed by a engine temperature sensor 76.

The temperature of the cooling water drawn from the body of water in which the watercraft or outboard motor 11 is operated is measured by a water temperature sensor 77. As has been noted, those sensors described may be just typical of any of the wide variety of sensors utilized for engine control.

In addition to controlling timing of firing of the spark plugs 71 and initiation and duration of fuel injection by the fuel injectors 43, the ECU 68 may also control a lubricating system. This is comprised of an oil supply system including a pump 78 that sprays oil into the intake passages 29 for engine lubrication. In addition, some forms of direct lubrication may be also employed for delivering lubricant directly to certain components of the engine.

The system as thus far described may be considered to be conventional and for that reason, where any component has not been illustrated or described in detail, reference may be had to conventional or known structures with which to practice the invention.

In accordance with an important feature of the invention, the engine 13 is provided with two additional sensors which are not normally used in engine control systems. These include a first sensor 81 which is mounted in the cylinder head assembly 23 contiguous to the downstream side of each fuel injector 43. This sensor 79 is an air flow sensor that will sense the velocity or volume of air flowing through the combustion chamber in the downstream direction from the nozzle portion of the fuel injector 43 toward the exhaust port 36.

This velocity is important because, as will become apparent hereinafter, it determines not only the time at which the fuel charge may pass across the exhaust port 36 but also, it effects the mixing of the fuel with the air and the size of the fuel particles. Basically, the larger the fuel particle, the more difficult it is to bum all of the fuel in the particle before it passes through the exhaust port on the next cycle after combustion has initiated. In other words, if the fuel particles are too large, there is a likelihood that some fuel will be unburned and exit the combustion chamber along with the exhaust gases.

For similar reasons, an air flow velocity sensor 79 is also provided in the auxiliary scavenge passage 35 that leads to the auxiliary scavenge port 34. It should be noted that in connection with the control strategy, either or both of the sensor 79 or 81 may be employed. Those skilled in the art will understand from the following description, how this can be done.

The invention deals primarily with the timing of beginning of fuel injection, particularly under low speed and low load conditions. This may be understood by first referring to the timing diagram shown in FIG. 6.

Figure 5:
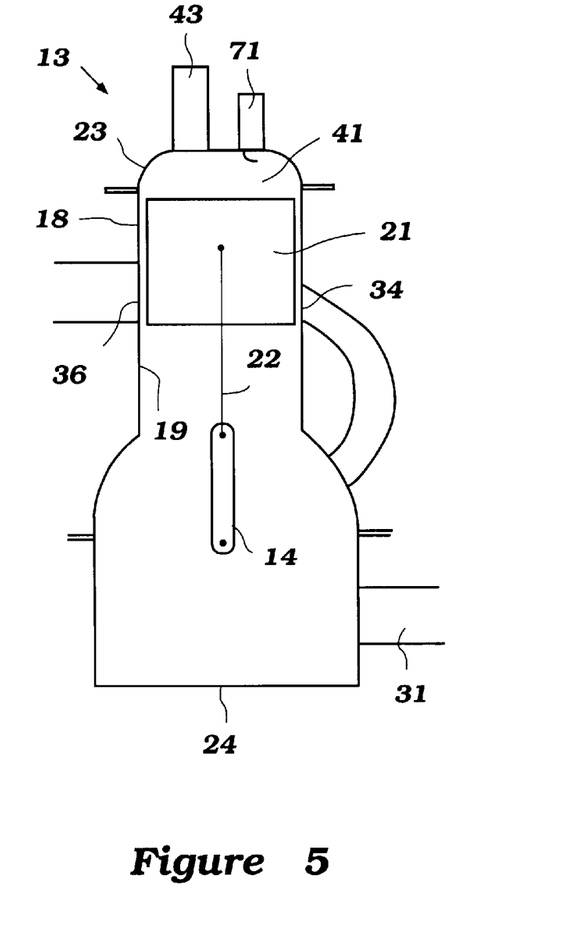
FIG. 5 is a view, in part similar to FIG. 4 and shows the piston at its top dead center position.
Figure 6:
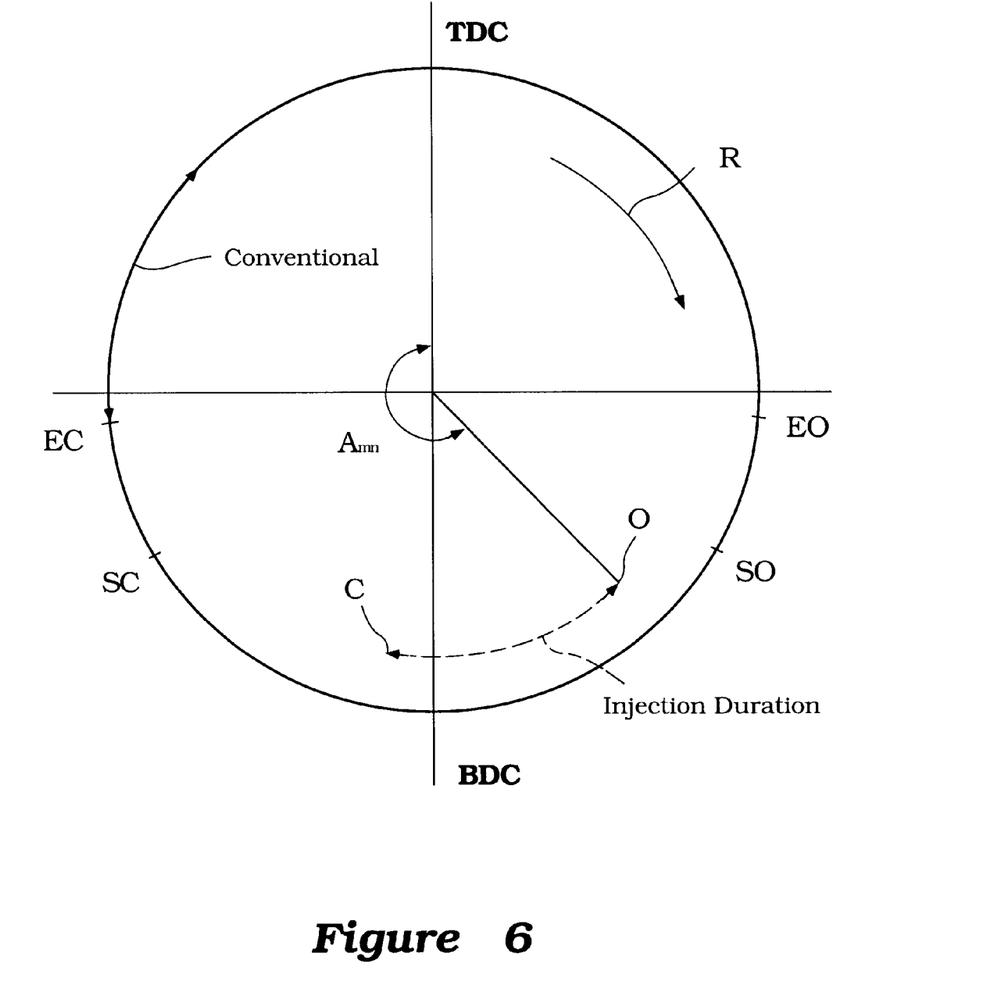
FIG. 6 is a timing diagram showing the fuel injection strategy in accordance with the invention in relation to crank angle and also the prior art type of strategy.

The direction of crankshaft rotation is indicated by the arrow R and the piston top dead center position, as shown in FIG. 5, is indicated at TDC in FIG. 6. Bottom dead center position (FIG. 4) is indicated in FIG. 6 as BDC. This figure also shows the timing of opening of the scavenge and exhaust ports and their respective closing. The opening of the exhaust ports 36 occurs when the piston passes the upper edge 82 (FIG. 2) of the exhaust port 36. This point is indicated as EO in FIG. 6.

As the pistons 21 continue their downward movement eventually the scavenge ports will open when their upper edges 83 are opened by the downward movement of the pistons 21. This point appears in FIG. 6 as SO.

The scavenging operation continues when the piston 21 passes bottom dead center and begins to move upwardly to begin to close the scavenge ports 33 and 34 by passing their lower edges 84. Full closure of the scavenge ports occurs at the point SC in FIG. 6 when the piston again passes the upper edge 83 of the scavenge ports 33 and 34. Finally, the exhaust ports 36 are closed when the pistons 21 pass their upper edges 82 at the point EC.

With conventional engine injection strategies, the fuel injection is begun generally almost immediately after the exhaust ports 36 are closed with the duration being determined by the load on the engine. This is shown in FIG. 6. As may be seen in FIG. 3, the scavenge air flow acts so as to take the fuel patch and drive it toward the exhaust port 36. Thus, the conventional practice is to cause the injection to happen late in the cycle before the piston reaches top dead center and immediately before firing. As more fuel is required, the injection duration is extended. However, this may cause the fuel to travel to the exhaust port before combustion has been completed and when the exhaust port again opens some unburned fuel may escape.

Also the velocity of air flow in the combustion chamber at this time is relatively low and there will be poor mixing of fuel with the air. The low air velocity also results in poor flame propagation and poor and/or incomplete combustion results.

In accordance with the methodology described in our earlier copending application, the fuel injection timing is retarded so that it does not begin until some time after bottom dead center. However, for a variety of reasons which will be described shortly, this may not offer, under some running conditions, sufficient time for the fuel to fully evaporate and mix with the air. The factors which effect the degree of fuel vaporization and accordingly its complete combustion will now be described by particular reference to FIGS. 7–11 in order to permit those skilled in the art to understand the strategy of the invention.

Figure 7:
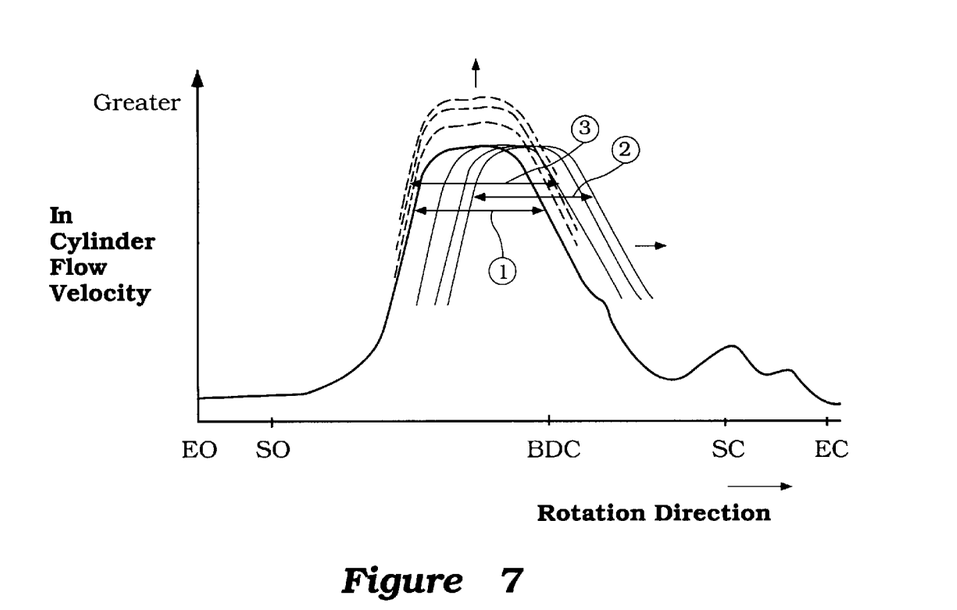
FIG. 7 is a graphical view that shows the air flow speed inside the cylinder during a cycle of operation with engine speed variations being shown by a family of solid line curves and air volume effects in broken line curves.

FIG. 7 shows the flow velocity in the combustion chamber under varying conditions of engine speed and intake air volume. The solid line family of curves show the velocity in relation to crank angle position under varying engine speeds with the higher speeds being shifted toward the right.

On the other hand, as the air flow is greater for a given engine speed as shown by the broken line family of curves, the flow velocity becomes greater.

It is desirable to inject the fuel at a time when the flow velocity is relatively high so that it will tend to cause the particles to disperse and become smaller. Flow velocity may be measured, as aforenoted, by either or both of the velocity sensors 79 and 81.

Figure 8:
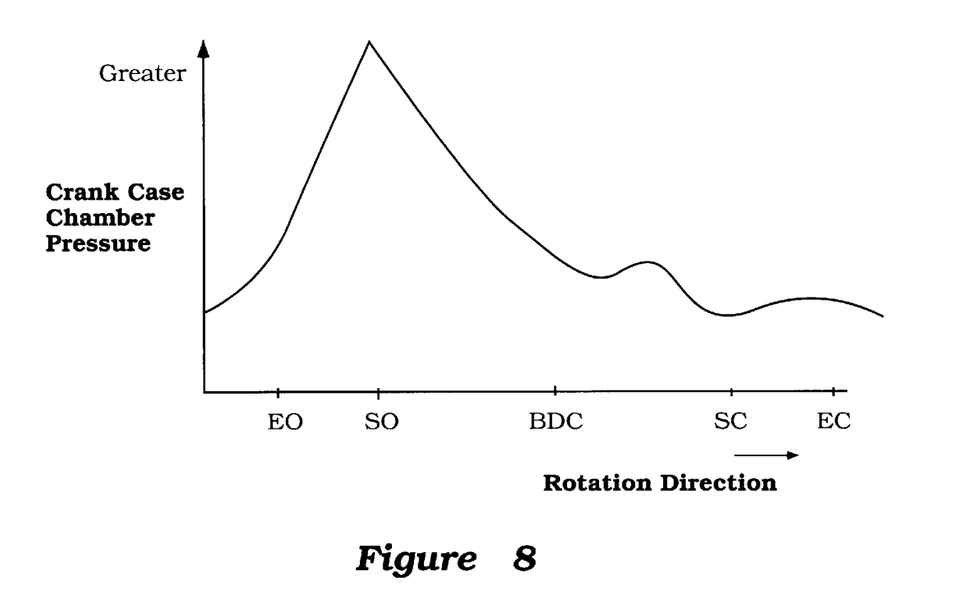
FIG. 8 is a graphical view showing how the pressure in the crankcase chamber of a single cylinder varies during a cycle of operation.

The relationship of the pressure in the crankcase chamber to the flow velocity also may be understood by reference to FIG. 8. This shows how the pressure in the crankcase chamber rises until the scavenge port is open and then falls off while the scavenging operation is continued.

Figure 9:
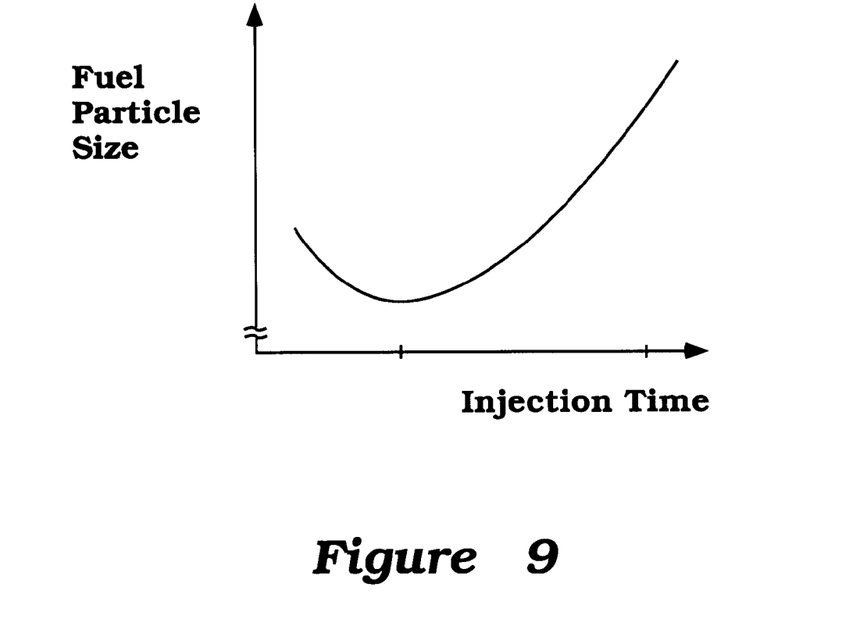
FIG. 9 is a graphical view showing how the time of injection time the particle diameter of the injected fuel.

It has also been found that injection time or duration also has an effect on the fuel particle size as may be seen in FIG.

9. When there are relatively small injection times, the particle size will be relatively large but it will decrease as the injection time is extended. However, beyond a certain optimum minimum injection time, further time of injection causes the particles to become larger. This is because the particles have a tendency to collide with each other and actually grow in size.

Figure 10:
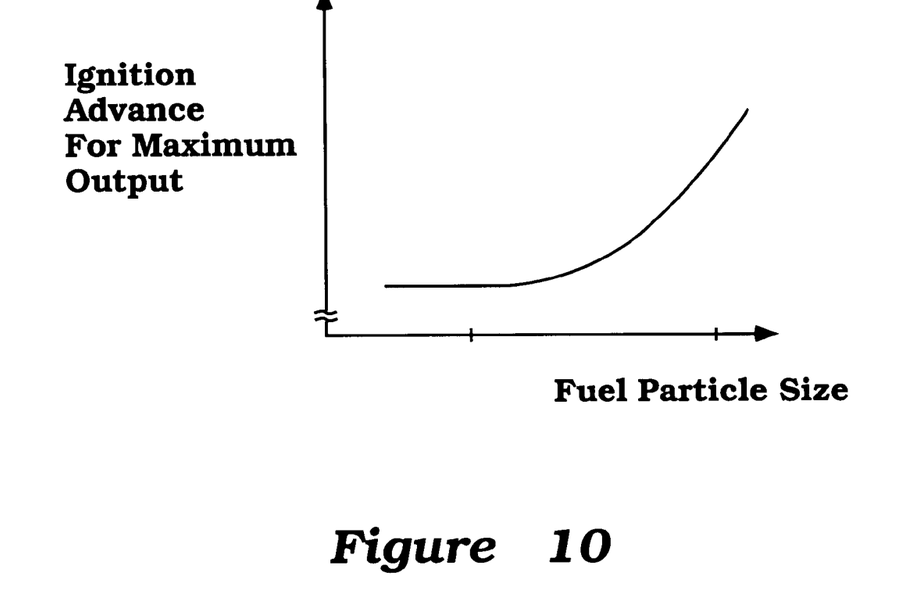
FIG. 10 is a graphical view showing how the optimum ignition advance for obtaining maximum power output varies in response to particle diameter of the injected fuel.

FIG. 10 shows the effect of particle size on the spark plug time firing in order to ensure complete combustion. That is, the larger the size of particle, the longer time it will take for that particle to be completely burned. Hence, when the particle size is kept fairly small, ignition timing can be close to top dead center. However, as the particle size becomes larger, there must be a greater advance in ignition timing so as to obtain maximum fuel consumption and this is not always desirable.

Figure 11:
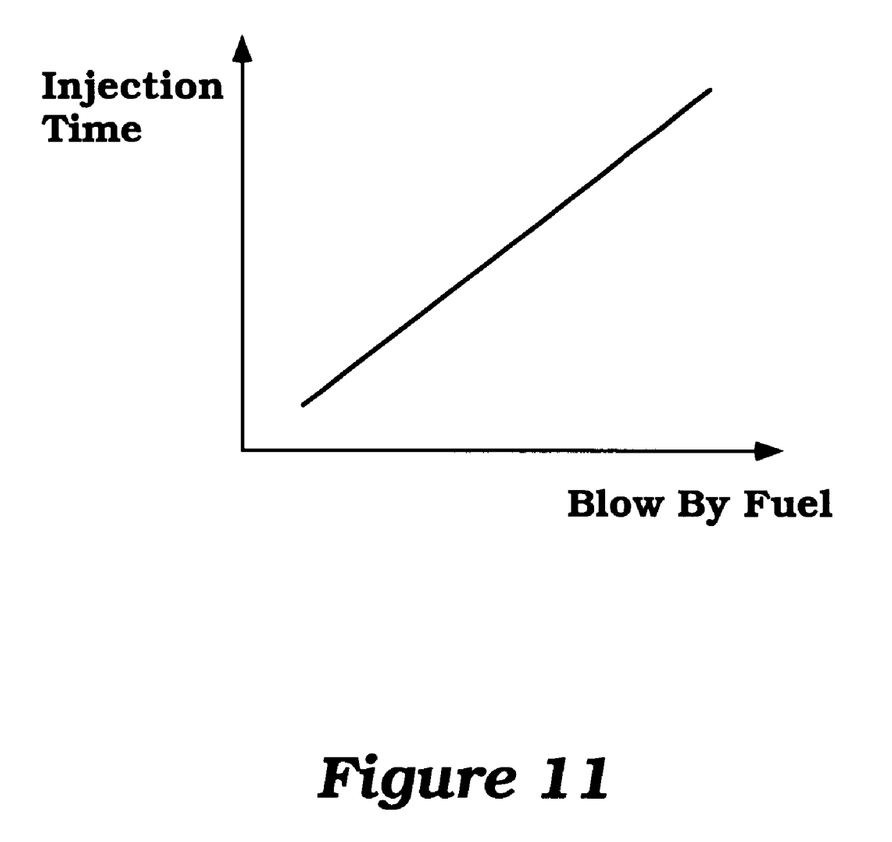
FIG. 11 is a graphical view showing how the injection timing duration effects the volume of fuel that may be blown out of the exhaust port.

Finally, FIG. 11 shows how injection time duration will cause blow by of fuel out of the exhaust port. That is, if the injection time is long enough regardless of when injection is initiated, there is a likelihood that some of the fuel particles will pass out of the exhaust port.

Figure 12:
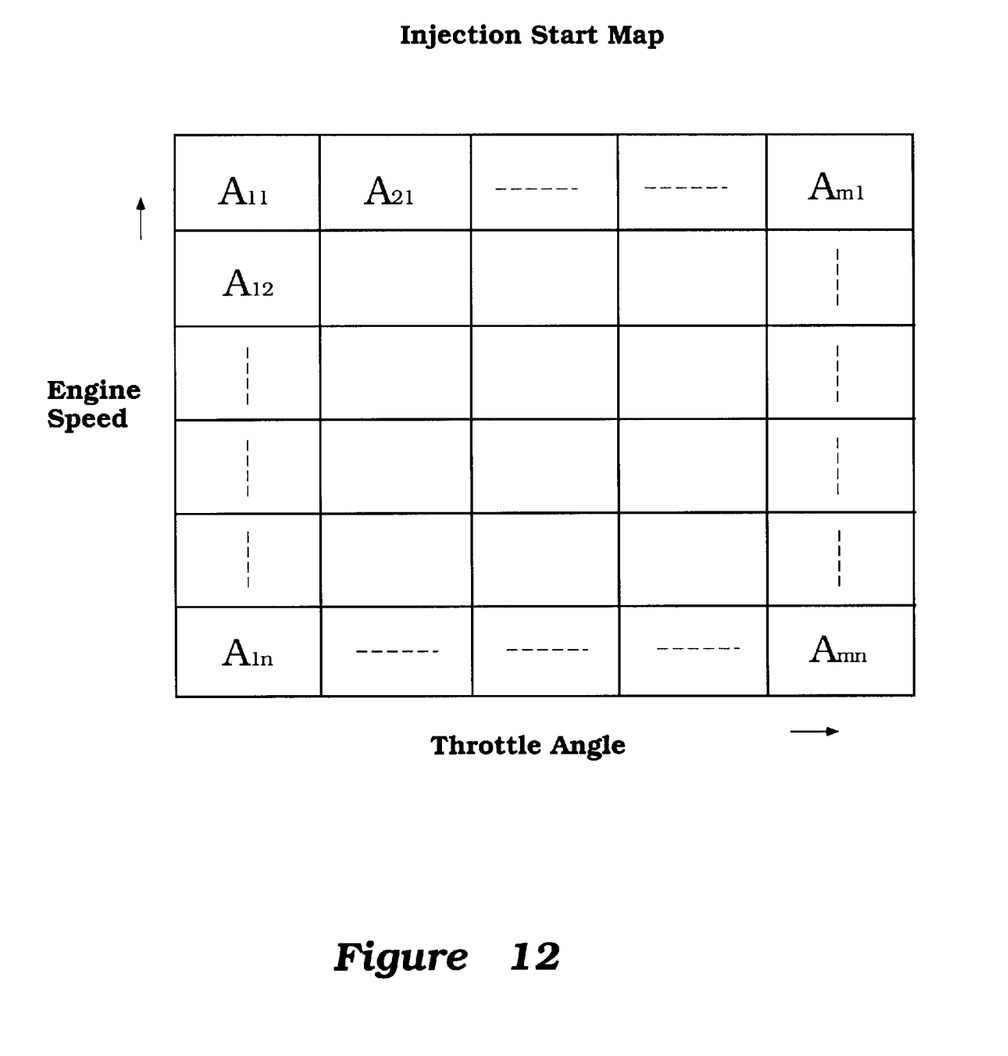
FIG. 12 is a map showing the memory conditions in the ECU for determining the beginning timing of fuel injection.

Therefore, in accordance with the invention, the injection timing is begun at a point that is indicated at O in FIG. 6 which is advanced at an angle Amn before top dead center and is continued for a duration that is indicated by the scope of the dotted line in FIG. 6 until injection is terminated at point C. The timing of fuel injection is chosen from a map as shown in FIG. 12 which is dependent upon engine speed and engine load in the form of air flow or throttle valve position. This is done in such a way as to ensure that maximum performance will be obtained while a minimum of blow by of fuel will occur. Thus, the fuel economy is substantially increased and at the same time the power output can be kept high with exhaust emissions maintained low.

Injection duration can be controlled by any suitable strategy bearing in mind the aforenoted factors.

By doing this, it is possible to obtain better mixing of the fuel and air thus making a substantial reduced reduction in the amount of hydrocarbon emissions by improving combustion and combustion efficiency. Also, by advancing the timing of injection start from that conventionally employed, the airflow velocity within the cylinder is higher, as seen in FIG. 7 and, therefore, fuel mixing is further improved.

Of course, the foregoing description is that of preferred embodiments of the invention and various changes may be made without departing from the spirit and scope of the invention as defined by the appended claims.

What is claimed is:

1. A two cycle crankcase compression internal combustion engine comprised of an engine body that defines a cylinder bore in which a piston reciprocates to form a combustion chamber, said cylinder bore being provided with at least one scavenge port and at least one exhaust port that are opened and closed by the reciprocation of said piston in said cylinder bore, a fuel injector mounted for spraying fuel directly into said combustion chamber, and a control system for controlling the fuel injection timing so that the beginning of fuel injection is initiated at a time when said exhaust port is still open and which point is determined at least in part by the actual air flow velocity within said combustion chamber so as to improve mixing of the injected fuel with the air within said combustion chamber and to insure that unburned fuel will not reach said exhaust port due to such air flow velocity within said combustion chamber before said exhaust port closes.

2. A two cycle crankcase compression internal combustion engine as set forth in claim 1 wherein the air flow velocity is determined at least in part by the speed of said engine.

3. A two cycle crankcase compression internal combustion engine as set forth in claim 1 wherein the air flow velocity is determined at least in part by the air flow to said engine.

4. A two cycle crankcase compression internal combustion engine as set forth in claim 3 wherein the air flow to the engine is determined by the position of a throttle valve in an air induction system of said engine.

5. A two cycle crankcase compression internal combustion engine as set forth in claim 4 wherein the air flow velocity is also determined at least in part by the speed of said engine.

6. A method of operating a two cycle crankcase compression internal combustion engine comprised of an engine body that defines a cylinder bore in which a piston reciprocates to form a combustion chamber, said cylinder bore being provided with at least one scavenge port and at least one exhaust port that are opened and closed by the reciprocation of said piston in said cyliner bore, a fuel injector mounted for spraying fuel directly into said combustion chamber, said method comprising the steps of determining the actual air flow velocity in said combustion chamber and controlling the fuel injection timing so that the beginning of fuel injection is initiated at a time when said exhaust port is still open and which point is selected at least in part by the determined air flow velocity in said combustion chamber so as to improve mixing of the injected fuel with the air and to insure that unburned fuel will not reach said exhaust port before it closes.

7. A method of operating a two cycle crankcase compression internal combustion engine as set forth in claim 6 wherein the air flow velocity is determined at least in part by the speed of said engine.

8. A method of operating a two cycle crankcase compression internal combustion engine as set forth in claim 6 wherein the air flow velocity is determined at least in part by the air flow to said engine.

9. A method of operating a two cycle crankcase compression internal combustion engine as set forth in claim 8 wherein the air flow to the engine is determined by the position of a throttle valve in an air induction system of said engine.

10. A method of operating a two cycle crankcase compression internal combustion engine as set forth in claim 9 wherein the air flow velocity is also determined at least in part by the speed of said engine.

11. A two cycle crankcase compression internal combustion engine comprised of an engine body that defines a cylinder bore in which a piston reciprocates to form a combustion chamber, said cylinder bore being provided with at least one scavenge port and at least one exhaust port that are opened and closed by the reciprocation of said piston in said cylinder bore, a fuel injector mounted for spraying fuel directly into said combustion chamber, and a control system for controlling the fuel injection timing so that the beginning of fuel injection is initiated at a time when said exhaust port is still open and which point is determined at least in part by the air flow velocity in said combustion chamber as determined at least in part by an air velocity sensor so as to improve mixing of the injected fuel with the air and to insure that unburned fuel will not reach said exhaust port before it closes.

12. A two cycle crankcase compression internal combustion engine as set forth in claim 11 wherein the air velocity sensor is positioned directly in the combustion chamber.

13. A two cycle crankcase compression internal combustion engine as set forth in claim 11 wherein the velocity sensor is disposed contiguous to the fuel injector.

\* \* \* \* \*